United States Patent
Murphy et al.

(10) Patent No.: US 11,727,824 B2
(45) Date of Patent: Aug. 15, 2023

(54) SYSTEM AND METHOD FOR TEACHING COMPUTER PROGRAMMING

(71) Applicant: Robotify Labs Limited, Glasnevin (IE)

(72) Inventors: Andrew Murphy, Terenure (IE); Adam Dalton, Donaghmede (IE); Evan Darcy, Kinsealy (IE)

(73) Assignee: ROBOTIFY LABS LIMITED, Glasnevin (IE)

( * ) Notice: Subject to any disclaimer, the term of this patent is extended or adjusted under 35 U.S.C. 154(b) by 991 days.

(21) Appl. No.: 16/254,171

(22) Filed: Jan. 22, 2019

(65) Prior Publication Data

US 2020/0234609 A1 Jul. 23, 2020

(51) Int. Cl.
*G09B 19/00* (2006.01)
*G05D 1/00* (2006.01)

(52) U.S. Cl.
CPC ....... *G09B 19/0053* (2013.01); *G05D 1/0016* (2013.01); *G05D 1/0022* (2013.01); *G05D 1/0033* (2013.01); *G05B 2219/40174* (2013.01); *G05B 2219/50391* (2013.01)

(58) Field of Classification Search
CPC .................. G09B 19/0053; G06B 2219/40174
See application file for complete search history.

(56) References Cited

U.S. PATENT DOCUMENTS

| | | | |
|---|---|---|---|
| 10,803,766 B1 * | 10/2020 | Donovan | H04L 67/22 |
| 2015/0360366 A1 * | 12/2015 | Gupta | B25J 13/06 434/118 |
| 2017/0053550 A1 * | 2/2017 | Lau | G09B 5/02 |
| 2018/0350100 A1 * | 12/2018 | Hanson | G06F 16/487 |
| 2019/0089597 A1 * | 3/2019 | Pathak | H04L 41/142 |
| 2019/0152703 A1 * | 5/2019 | Sellner | B65G 1/1378 |

* cited by examiner

*Primary Examiner* — Peter R Egloff
(74) *Attorney, Agent, or Firm* — Brian J. Colandreo; Jeffery T. Placker; Holland & Knight LLP

(57) ABSTRACT

This invention relates to a system for teaching computer programming comprising a robot farm, a plurality of remote computing devices and a server. The robot farm comprises a plurality of pods, each housing a robot and having a video camera to capture live video of the robot in the pod. The computing devices are each associated with a robot and transmit control commands to the robot to cause the robot to carry out an action and in return receive live video footage of the robot. The server communicates with the robots, the video cameras and the plurality of remote computing devices to relay control commands from the computing devices to the robots and live video from the video cameras to the computing devices. The computing devices further comprise a user interface having panes, including a programming pane for receipt of control commands, and a video feed pane for displaying video feed of the robot.

21 Claims, 18 Drawing Sheets

SYSTEM AND METHOD FOR TEACHING COMPUTER PROGRAMMING

BACKGROUND OF THE INVENTION

This invention relates to a system and a computer-implemented method for teaching computer programming.

The importance of computer programming skills in modern society has increased to the point where computer programming skills are being taught to children as young as eight years old. In some elementary schools, computer programming is now taught as part of the syllabus.

However, as with many subjects that are often perceived as difficult or demanding, it can often prove challenging for teachers to engender an affection for the subject in their students. Furthermore, it can often prove difficult to achieve high knowledge retention rates amongst the students. In order to more comprehensively engage the students and make learning computer programming more enjoyable, it has been proposed to use programmable robots as part of the learning process. The students effectively learn to program by programming instructions which translate into actions for the robot to perform. This has been found to facilitate knowledge retention and improve student engagement. It is believed that one such system is that disclosed in Chinese Published Patent Application No. CN107479417 in the name of Taizhou Jiangnan Teaching Equipment Co Ltd, whereby students can learn to program by programming a robot to perform certain actions.

Although the system described in CN107479417 offers a significant improvement over other known systems and methods for teaching computer programming skills, there are however problems with that offering. First of all, it is relatively expensive to purchase the robot. School budgets are already under pressure and additional capital expenditure on what are perceived as luxury or non-essential items are hard to justify. If class sizes are of the order of 30 students per class, it would typically be prohibitively expensive to purchase a robot for each child in the class. In some cases, a smaller number of robots may be purchased and the children can work in groups however this reduces the amount of time that each of the students has to work individually with the robot and practice their programming.

Secondly, the robots must be safely stored when not in use and this takes up valuable storage space in the school. Thirdly, the robots must be maintained and their batteries replaced frequently and this introduces additional work for the staff. Finally, if a robot should break down for any reason, for example through normal wear and tear, it must be returned to the manufacturer or a trusted third party for repair and this further reduces the amount of time that the robot is available to the students.

It is an object of the present invention to provide a system and a computer-implemented method for teaching computer programming that overcomes at least one of the above-identified problems and that offers a useful choice to the consumer.

SUMMARY OF THE INVENTION

According to the invention there is provided a system for teaching computer programming comprising:
- a robot farm, a plurality of remote computing devices, and a server;
- the robot farm comprising a plurality of pods, each pod housing a robot therein and each pod having a video camera associated therewith operable to capture and transmit a live video feed of the robot in the pod, each robot having a communications module for receiving control commands, a processor for processing control commands, a power supply, and at least one actuator operable to actuate the robot in response to control commands;
- the plurality of remote computing devices each being associated with a robot in the robot farm, the remote computing devices each having a communications module for transmitting control commands to the robot associated therewith and receiving live video footage of the robot associated therewith, and a processor for processing the control commands;
- each of the plurality of remote computing devices having a user interface having a plurality of panes, including a programming pane for receipt of control commands, and a video feed pane for displaying the live video feed of the robot;
- the server having a communication module for communication with each of the plurality of robots in the robot farm, each of the video cameras in the robot farm and each of the plurality of remote computing devices; the server having a processor and a memory, and the server being operable to relay control commands from the plurality of remote computing devices to the plurality of robots and to relay the live video feed from the plurality of video cameras in the robot farm to the plurality of remote computing devices.

By having such a system, the school or the student will not have to incur the expense of purchasing a robot. Advantageously, the student, using a remote computing device, may send instructions to a robot in the robot farm. The instructions will in turn be translated into actions by the robot. A live video of the robot moving in real time will be transmitted back to the remote computing device and the student will have the enhanced experience of seeing the effect of their code on the robots operation. Furthermore, this obviates the need for the school to store and maintain the robots. As the robots are all kept in a remote robot farm, a technician at the robot farm may monitor, repair and maintain each of the robots in the robot farm. If one robot should fail during a session, another robot can be assigned to the student resulting in the minimum amount of down time for the student. The layout of the user interface is also particularly simple and intuitive and importantly the student can simultaneously see their code and the robot video feed.

In one embodiment of the invention there is provided a system for teaching computer programming in which the user interface comprises a tutorial pane, the tutorial pane having user instructions for performing a task. In this way, a teacher may supply the content of the tutorial pane, which may include instructions, hints, and/or parameters for the exercise thereby clearly setting the task for the student to perform. Advantageously, the student will have this as part of the interface along with their code in the programming pane and the video feed from the robot in the video feed pane.

In one embodiment of the invention there is provided a system for teaching computer programming in which the user interface comprises a feedback pane, the feedback pane having an output comprising at least one of a compiled code and a commentary on the user-inputted control commands. This is seen as a particularly advantageous aspect of the invention as the student may see the actual syntactically correct code and compare it with the code that they have programmed. This will give them a feel for other representations of computer program code. Furthermore, the student may be provided with prompts, hints, tips, encouragement and/or feedback when they attempt to run their code.

In one embodiment of the invention there is provided a system for teaching computer programming in which the programming pane comprises a Visual Programming Language (VPL) Editor. This is seen as a particularly useful way to teach young students how to program. The VPL editor will allow the student to program using "blocks" of code that may be combined together by the VPL editor. This simplifies many of the programming concepts for the student. Furthermore, it also reduces the emphasis on learning specific syntax pertaining to a programming language and allows the user to focus less on the syntax and more on the actual logic behind the code.

In one embodiment of the invention there is provided a system for teaching computer programming in which the programming pane comprises a Blockly Editor. Alternatively, the programming pane comprises a Scratch Editor.

In one embodiment of the invention there is provided a system for teaching computer programming in which the user interface comprises a web page opened in a web browser. This is seen as a simple way of delivering the course content to the students and allow different students to log into the system with an internet connection. In this way, the minimum amount of proprietary software will be required at the end user side and the minimum number of licenses will be needed to use the software.

In one embodiment of the invention there is provided a system for teaching computer programming in which remote computing device comprises a code compiler embedded in the user interface. In this way, the code can be compiled on the client side, thereby reducing the computational requirement on the server side and speeding up the execution of instructions on the robots.

In one embodiment of the invention there is provided a system for teaching computer programming in which the control commands are transmitted using a Message Queuing Telemetry Transport (MQTT) protocol. This is seen as a particularly useful aspect of the present invention. By using the MQTT protocol for communication of control commands, the latency between instruction transmission and robot action are reduced to under 200 ms (0.2 seconds) which is very important to keep the child engaged. If the latency is too long, the child may become frustrated and/or disinterested which may result in their attention wandering to the detriment of the teaching opportunity. In addition, the use of the MQTT protocol will reduce the amount of data being transmitted to and from the servers, the user devices and the robots and will reduce the computation overhead at each of the devices. This is particularly important for the server as there may be a tendency for delay or server failure if there is a large amount of unused header and meta data received in a short space of time via http requests, for example.

In one embodiment of the invention there is provided a system for teaching computer programming in which the control commands are converted using a reduced bit set instruction protocol. Again, this is seen as a particularly useful aspect of the present invention. By using a reduced bit set instruction protocol, the amount of data that must be stored and processed by each of the devices, and in particular the processors on the robots, can be reduced significantly ensuring a faster, less latent system with reduced processing and memory requirements.

In one embodiment of the invention there is provided a system for teaching computer programming in which the reduced bit set instruction protocol has instructions of less than or equal to six bytes in length.

In one embodiment of the invention there is provided a system for teaching computer programming in which the video camera of the pod is positioned vertically over the pod to provide a plan view of the pod. In this way, a single camera will provide the user with the best viewpoint and will enable a range of activities such as mazes, games and the like.

In one embodiment of the invention there is provided a system for teaching computer programming in which the plurality of pods of the robot farm are arranged side by side in a matrix structure having a plurality of rows and a plurality of columns.

In one embodiment of the invention there is provided a system for teaching computer programming in which the pods are each bounded by a boundary wall surrounding the perimeter of the pod.

In one embodiment of the invention there is provided a system for teaching computer programming in which there are provided indicia printed on the floor of each pod.

In one embodiment of the invention there is provided a system for teaching computer programming in which the robot power supply comprises an inductively chargeable battery and in which at least a portion of the floor of each pod comprises an inductive charging pad for charging the robot power supply.

In one embodiment of the invention there is provided a system for teaching computer programming in which each of the robots comprises a vehicle having a motor and at least two wheels driven by the motor.

A system for teaching computer programming in which the vehicle is provided with a differential drive.

In one embodiment of the invention there is provided a system for teaching computer programming in which the vehicle is provided with a plurality of sensors. The sensors may be proximity sensors, IR sensors, ambient light sensors, temperature sensors or other sensors that may be used to increase the functionality of the system and enrich the user experience.

In one embodiment of the invention there is provided a computer implemented method of teaching computer programming comprising the steps of:
  providing, on a user computing device, a user interface having a plurality of panes including a programming pane and a video feed pane;
  receiving, in the programming pane of the user interface of the user computing device a control command;
  transmitting the control command from the user computing device to a robot in a robot farm via an intermediary server;
  capturing, using a video camera, a live video feed of the robot in the robot farm executing the control command;
  transmitting the video feed of the robot in the robot farm executing the control command to the user computing device via the intermediary server; and
  rendering, in the video feed pane of the user interface of the user computing device, the video feed of the robot in the robot farm executing the control command.

This is seen as a particularly suitable computer-implemented method of teaching computer programming to children that is believed will keep them engaged and more receptive to learning the subject matter. The student will see the consequence of their programmed code in almost real time, with only a short delay between their instruction and the execution of that instruction by the robot.

In one embodiment of the invention there is provided a computer implemented method of teaching computer programming in which the step of: receiving, in the programming pane of the user interface of the user computing device a control command further comprises receiving a control command in a VPL.

In one embodiment of the invention there is provided a computer implemented method of teaching computer programming in which the method comprises the step of converting the control command using a reduced bit set instruction protocol. In this way, the computational overhead will be reduced, thereby decreasing latency, processing requirement, memory requirement and/or cost.

In one embodiment of the invention there is provided a computer implemented method of teaching computer programming in which the control commands are transmitted using a MQTT protocol. This will reduce the amount of data transmitted in each control command, thereby resulting in a more reliable method that will not be prone to "crash" or "stall".

In one embodiment of the invention there is provided a computer implemented method of teaching computer programming in which the user interface comprises a tutorial pane and the method comprising the additional step of providing user instructions in the tutorial pane of the user interface.

In one embodiment of the invention there is provided a computer implemented method of teaching computer programming in which the user interface comprises a feedback pane and the method comprising the additional step of providing at least one of compiled code and commentary on the user inputted control commands in the feedback pane of the user interface.

BRIEF DESCRIPTION OF THE DRAWINGS

The invention will now be more clearly understood from the following description of some embodiments thereof given by way of example only with reference to the accompanying drawings, in which:—

DESCRIPTION OF THE PREFERRED EMBODIMENTS

Figure 1:
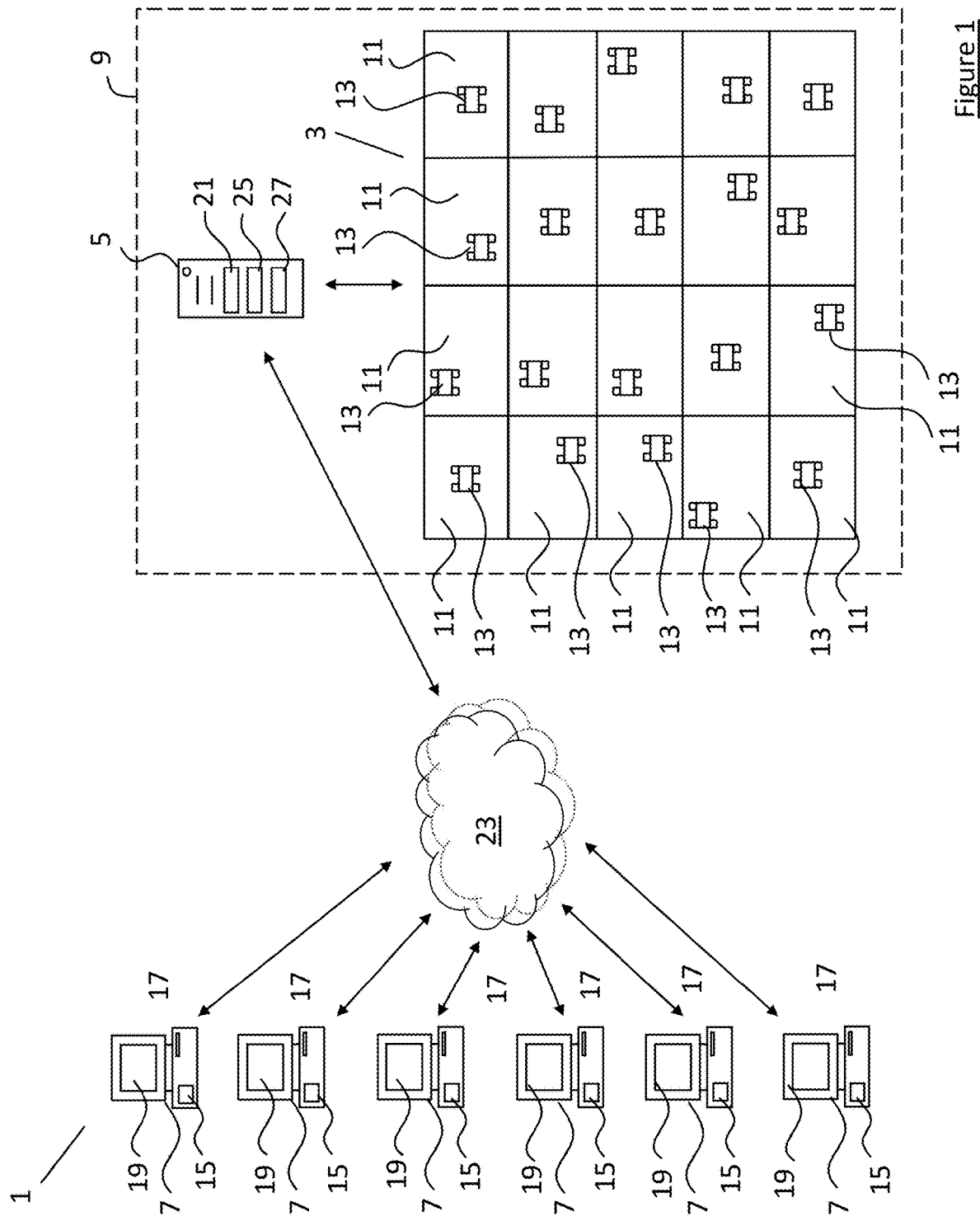
FIG. 1 is a diagrammatic representation of a system for teaching computer programming according to the invention.

Referring to FIG. 1, there is shown a system for teaching computer programming, indicated generally by the reference numeral 1, comprising a robot farm 3, a server 5 and a plurality of remote computing devices 7. The robot farm 3 and the server 5 are shown housed together in a facility 9 (indicated in dashed outline). The robot farm 3 comprises a plurality of pods 11 arranged in a matrix structure of rows and columns. Each pod houses a robot 13 therein and each pod has a video camera (not shown) associated therewith that is operable to capture and transmit a live video feed of the robot in the pod.

Figure 4A:
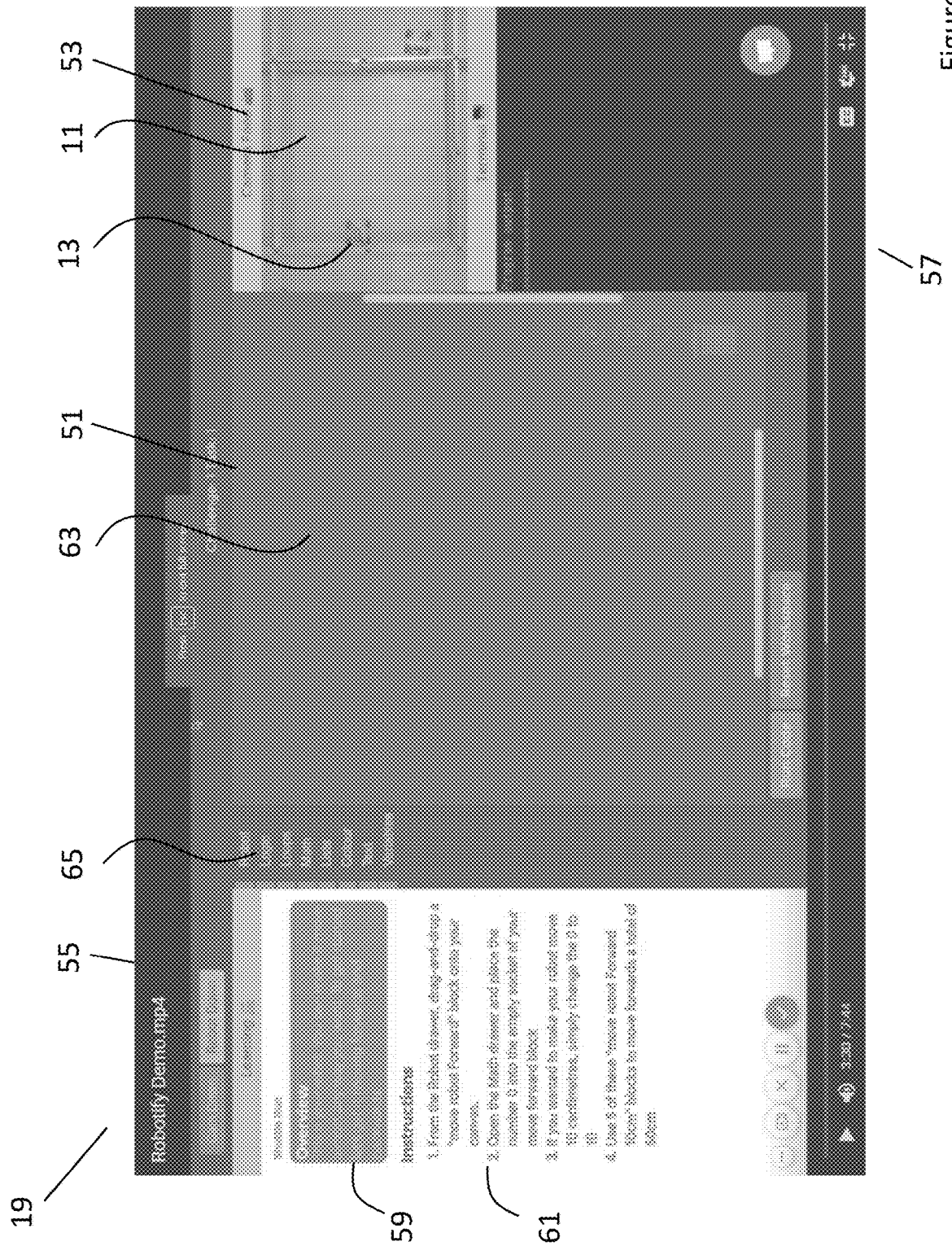
FIGS. 4(a) to 4(o) inclusive are screen shots of a user interface used in the system according to the invention.
Figure 4B:
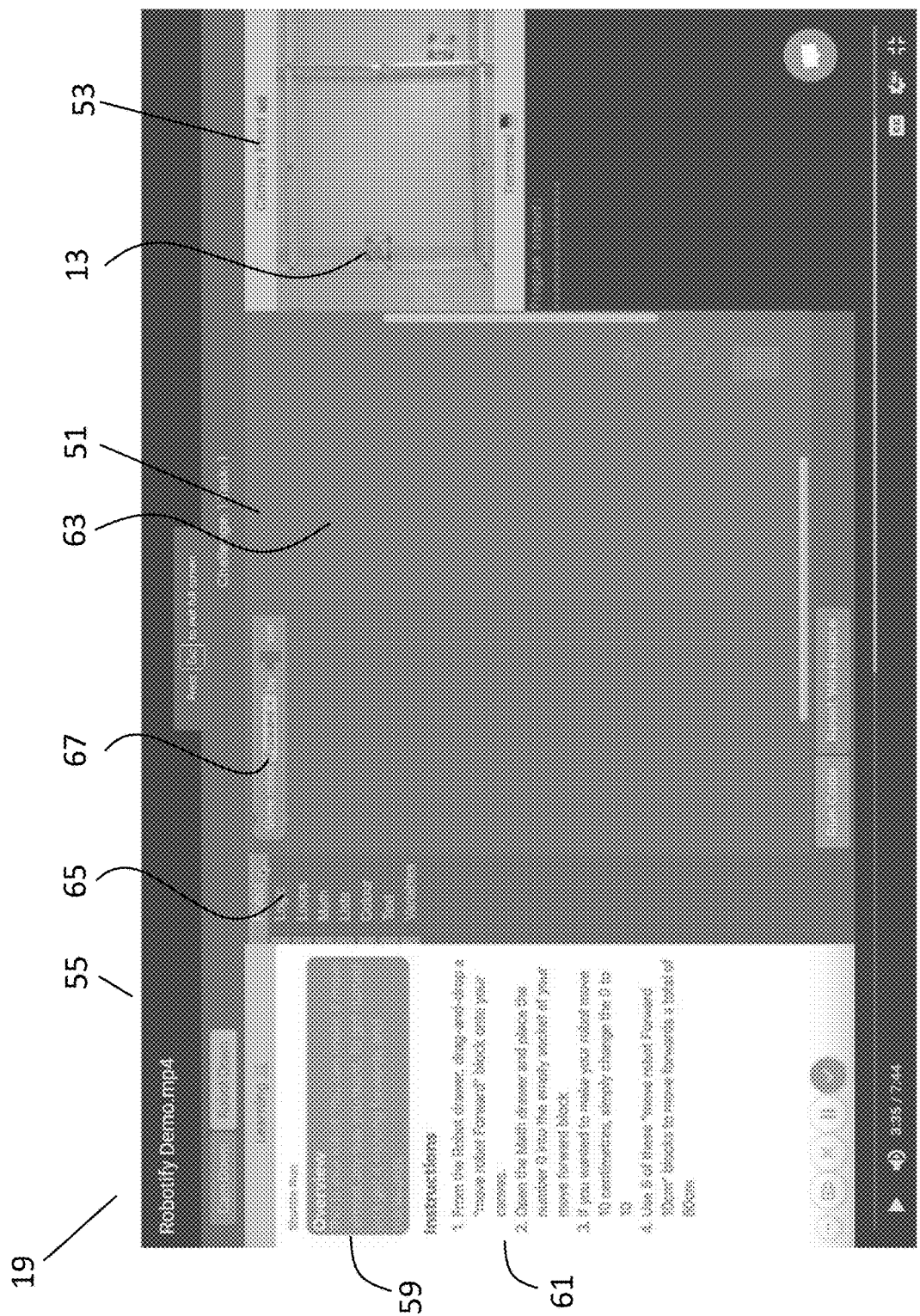
Figure 4C:
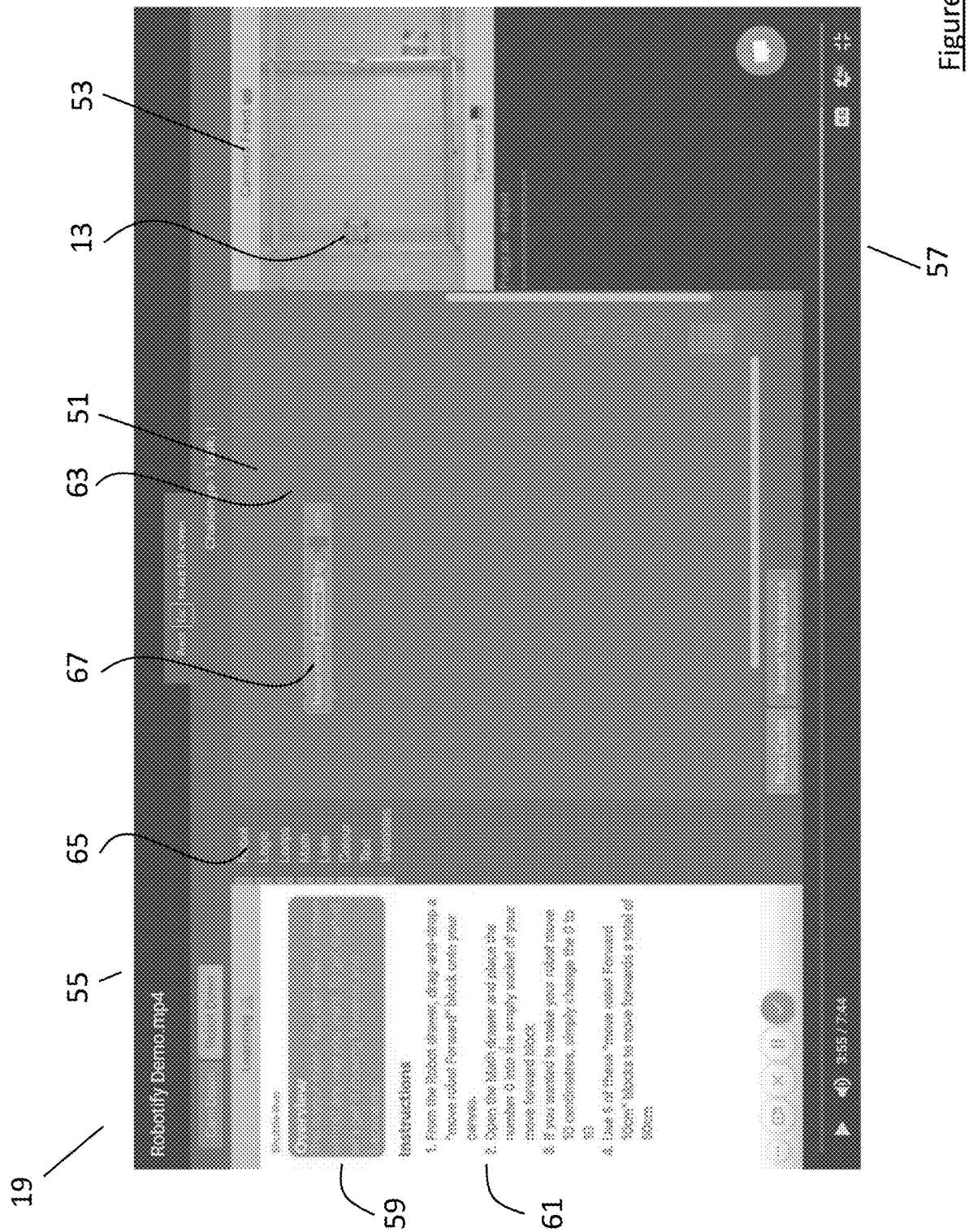
Figure 4D:
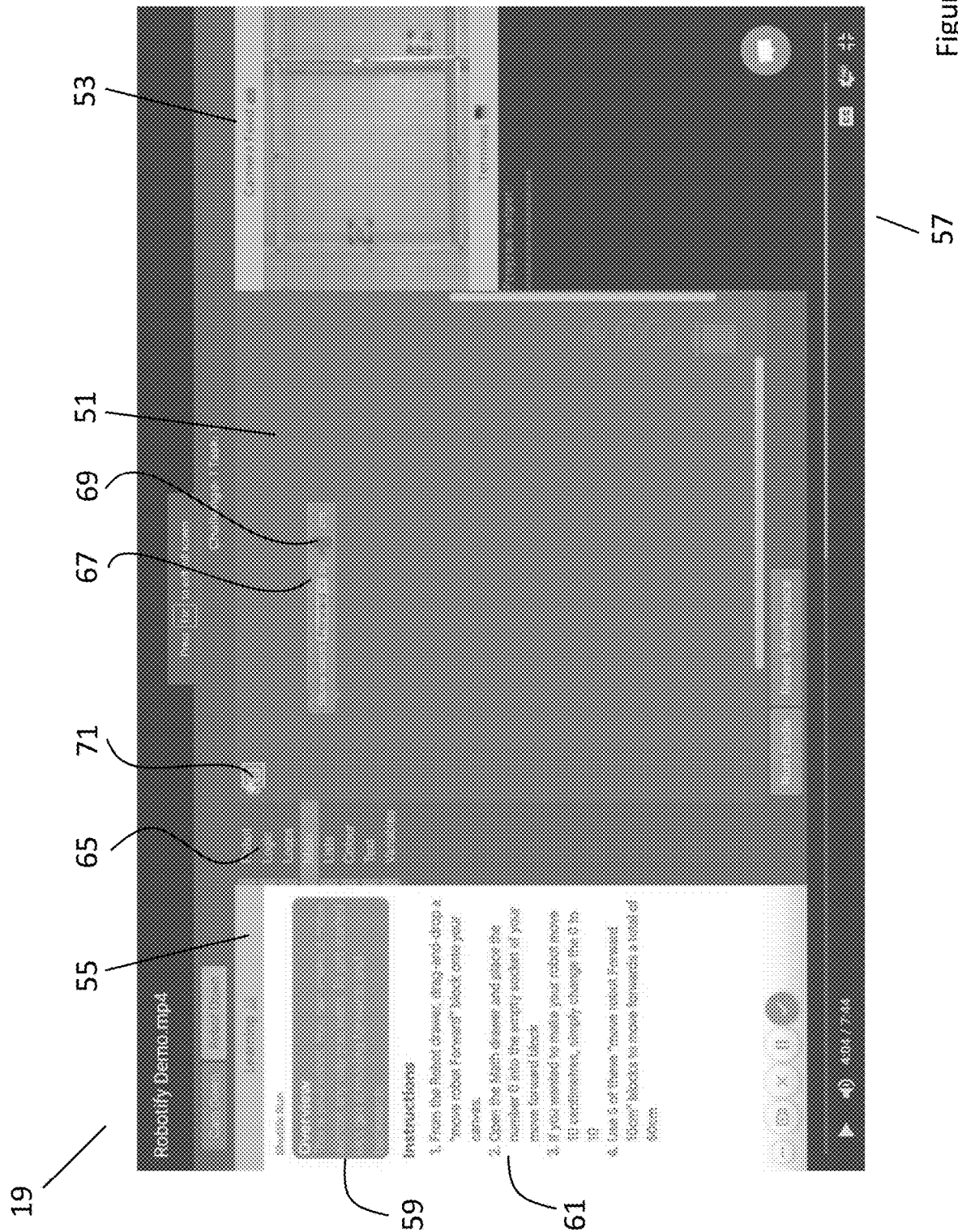
Figure 4E:
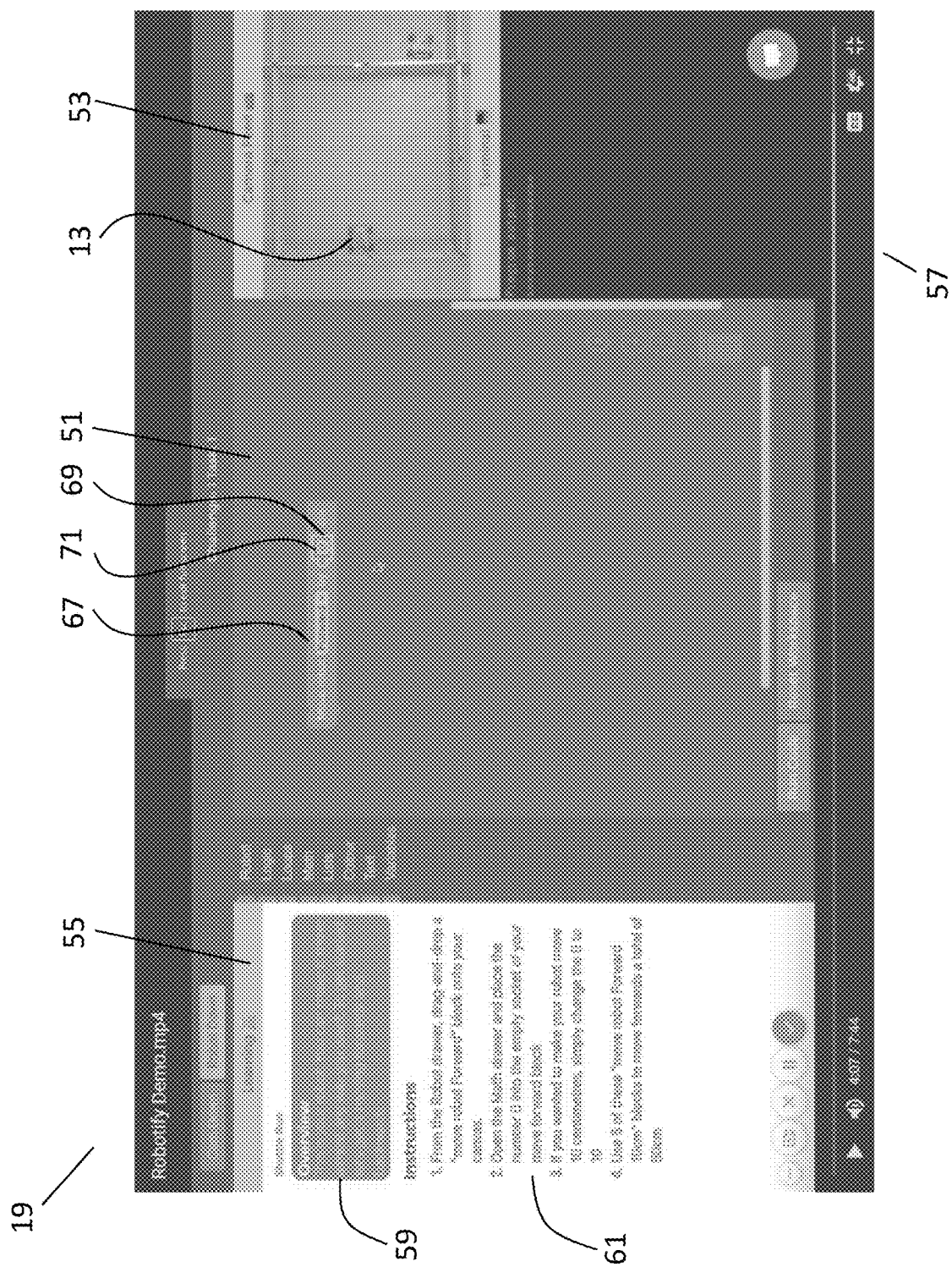
Figure 4F:
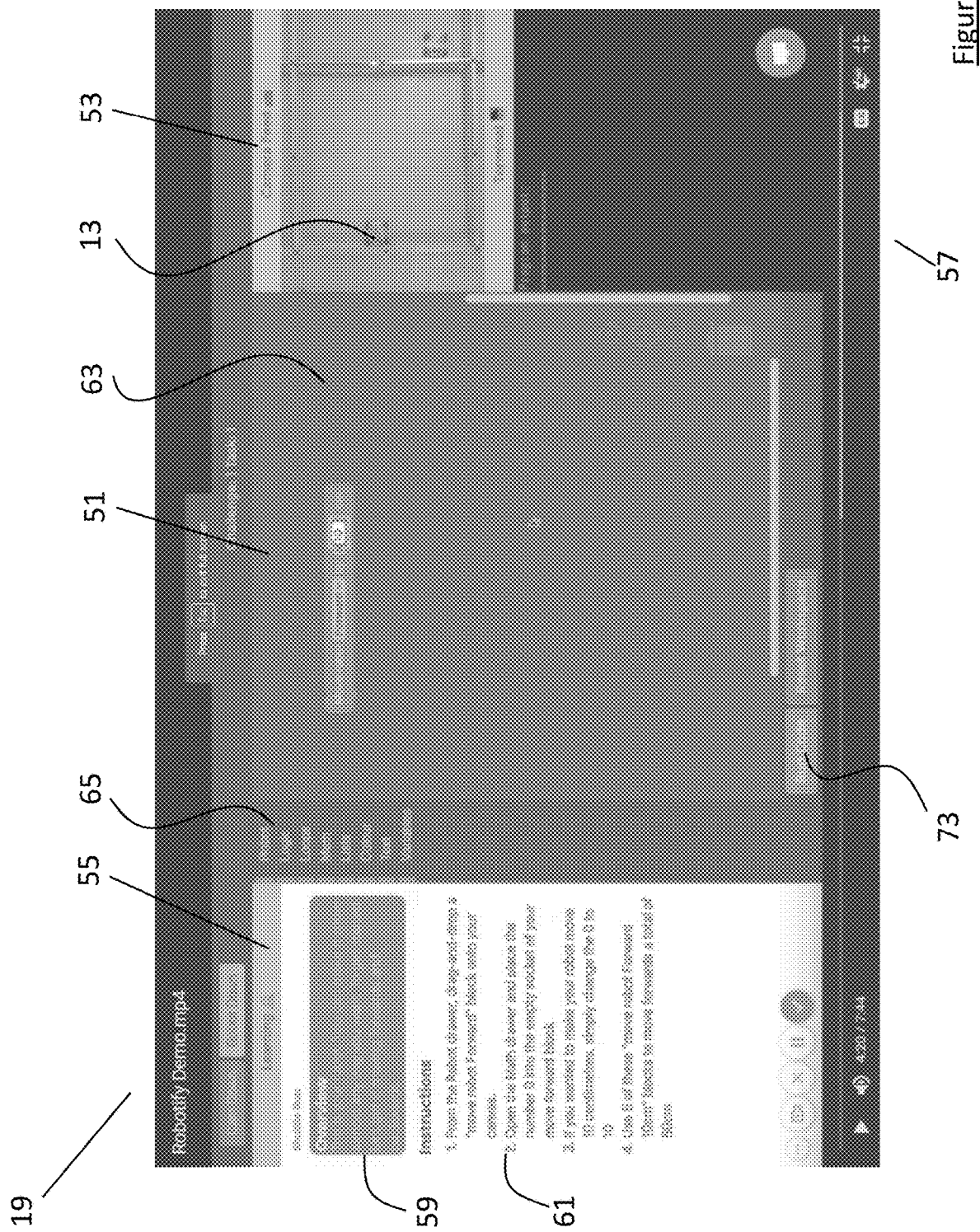
Figure 4G:
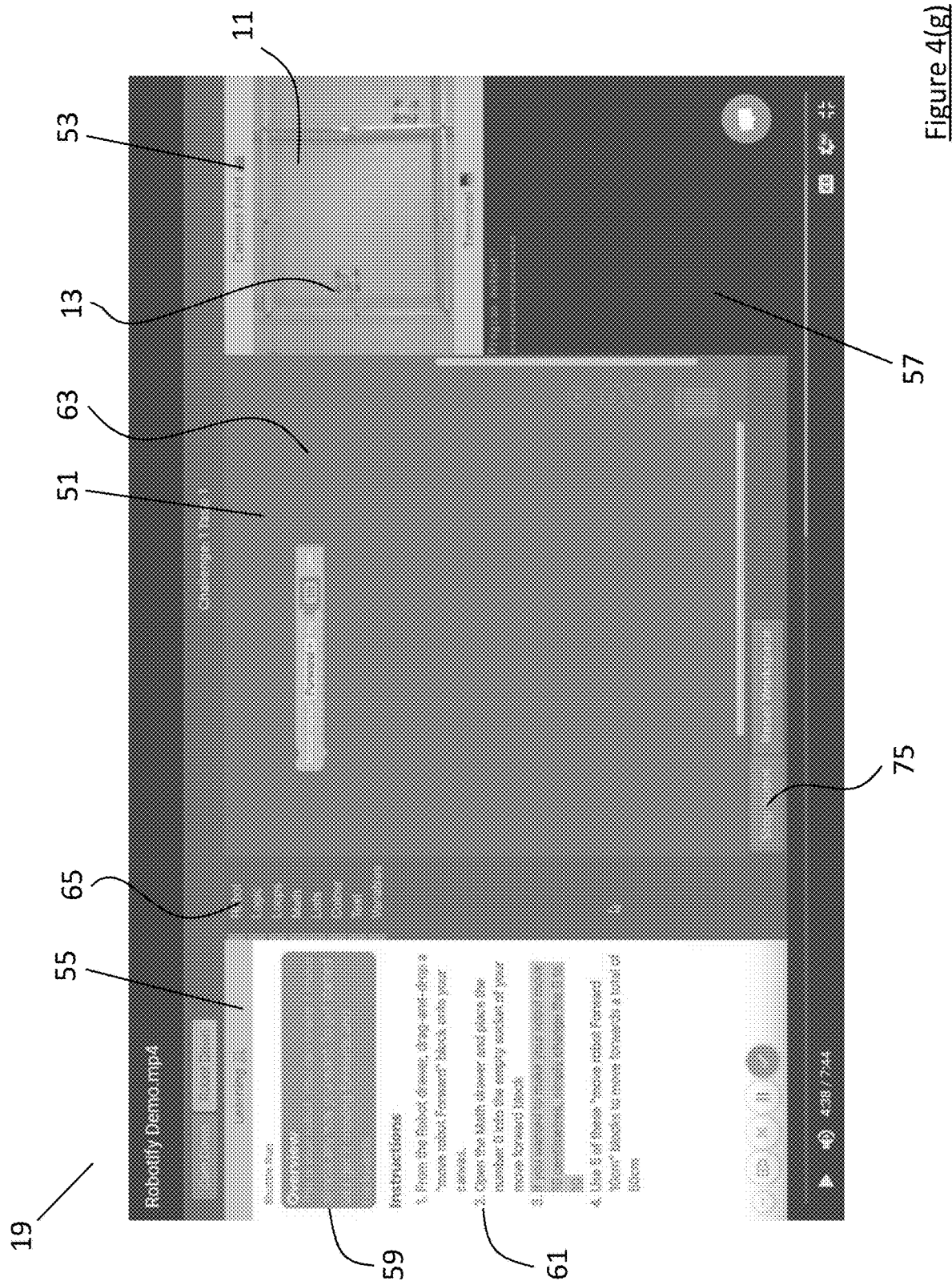
Figure 4H:
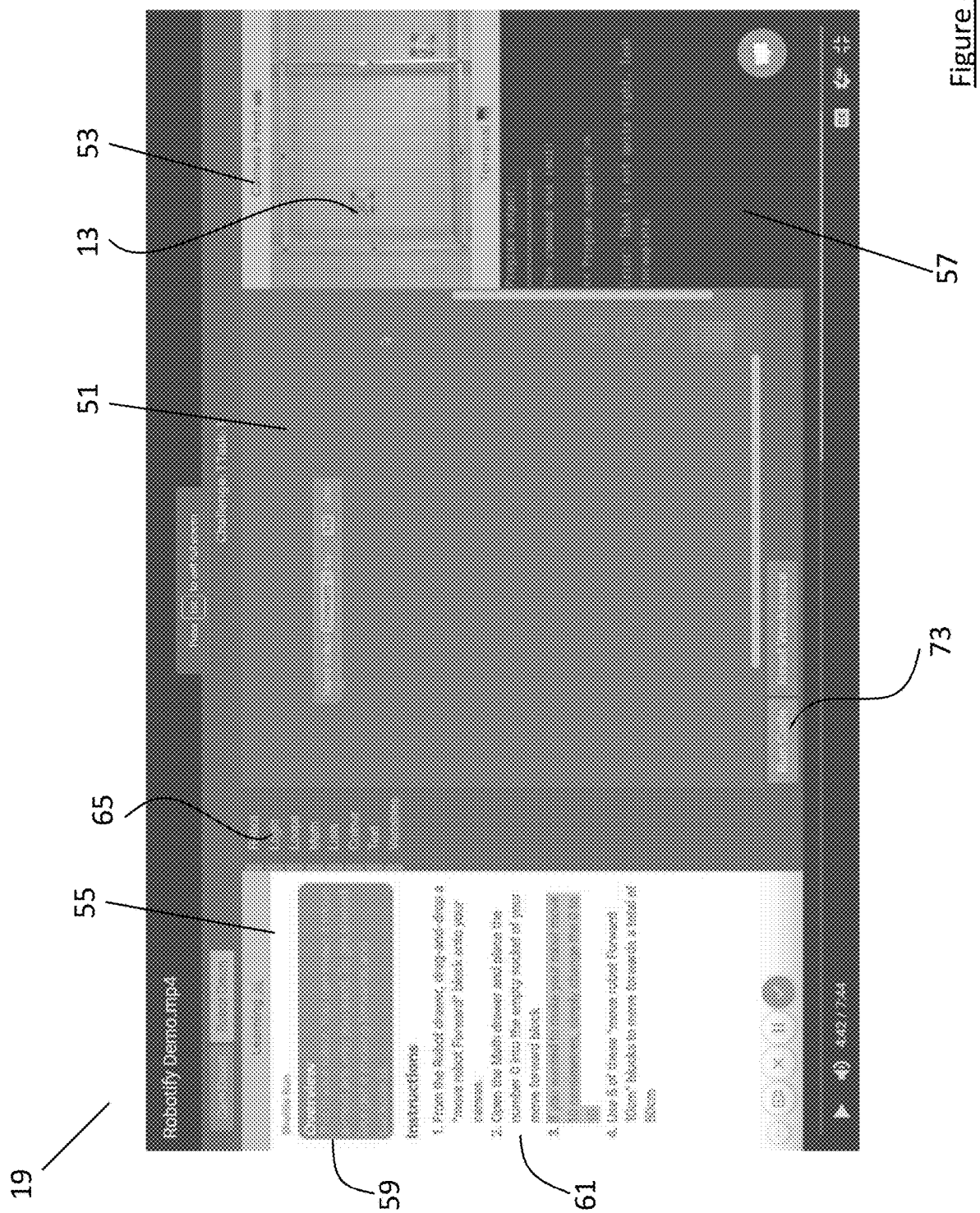
Figure 4I:
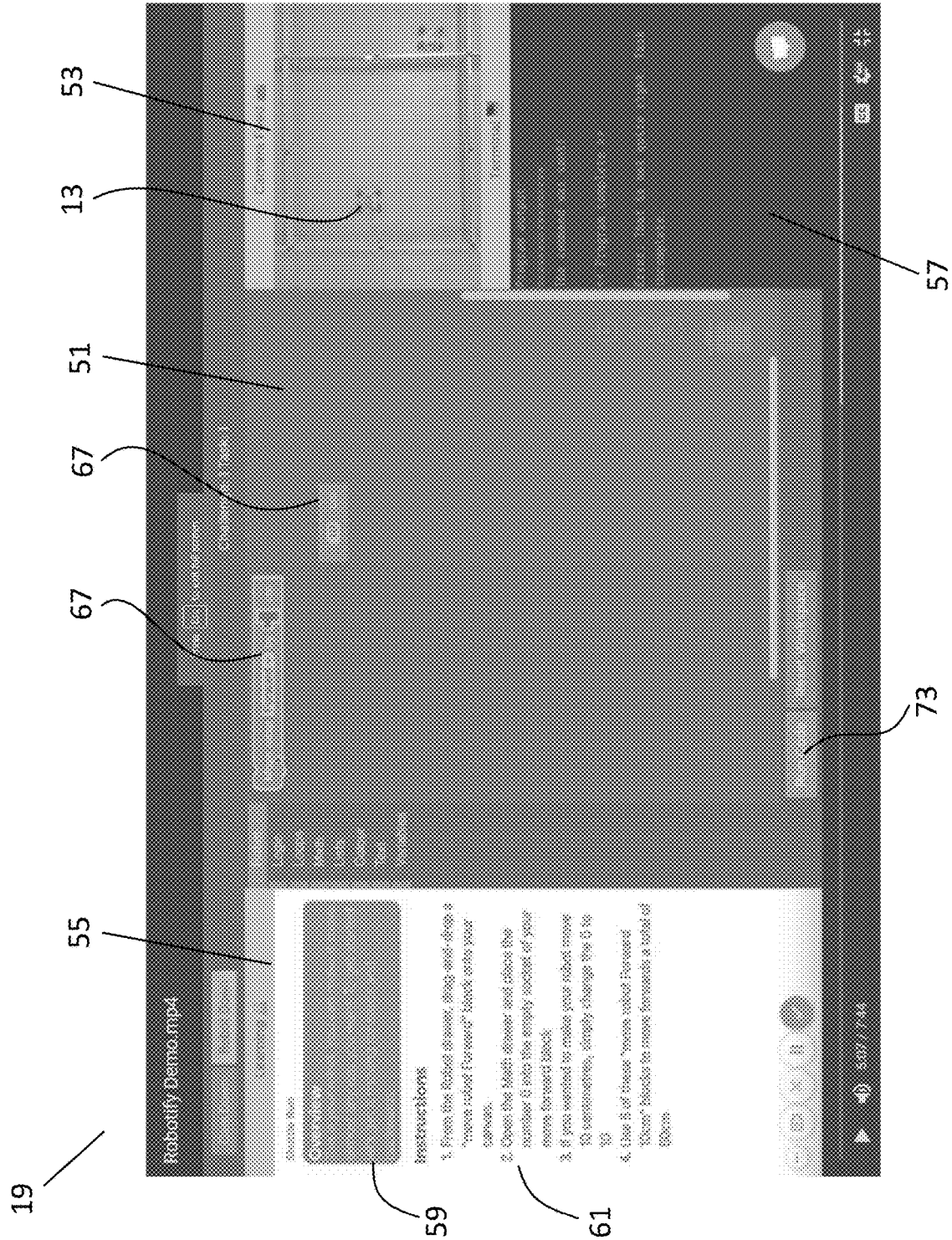
Figure 4I:
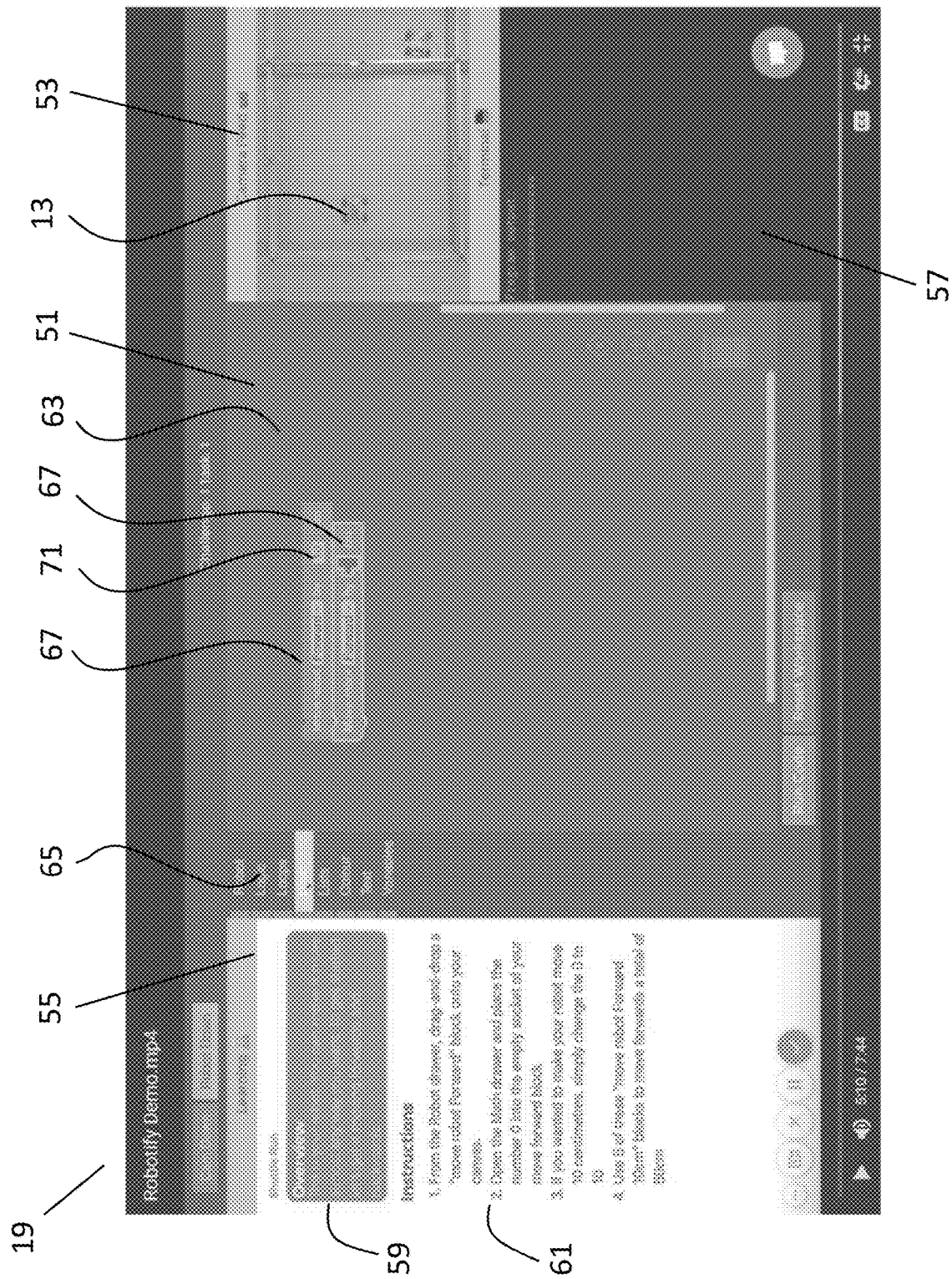
Figure 4K:
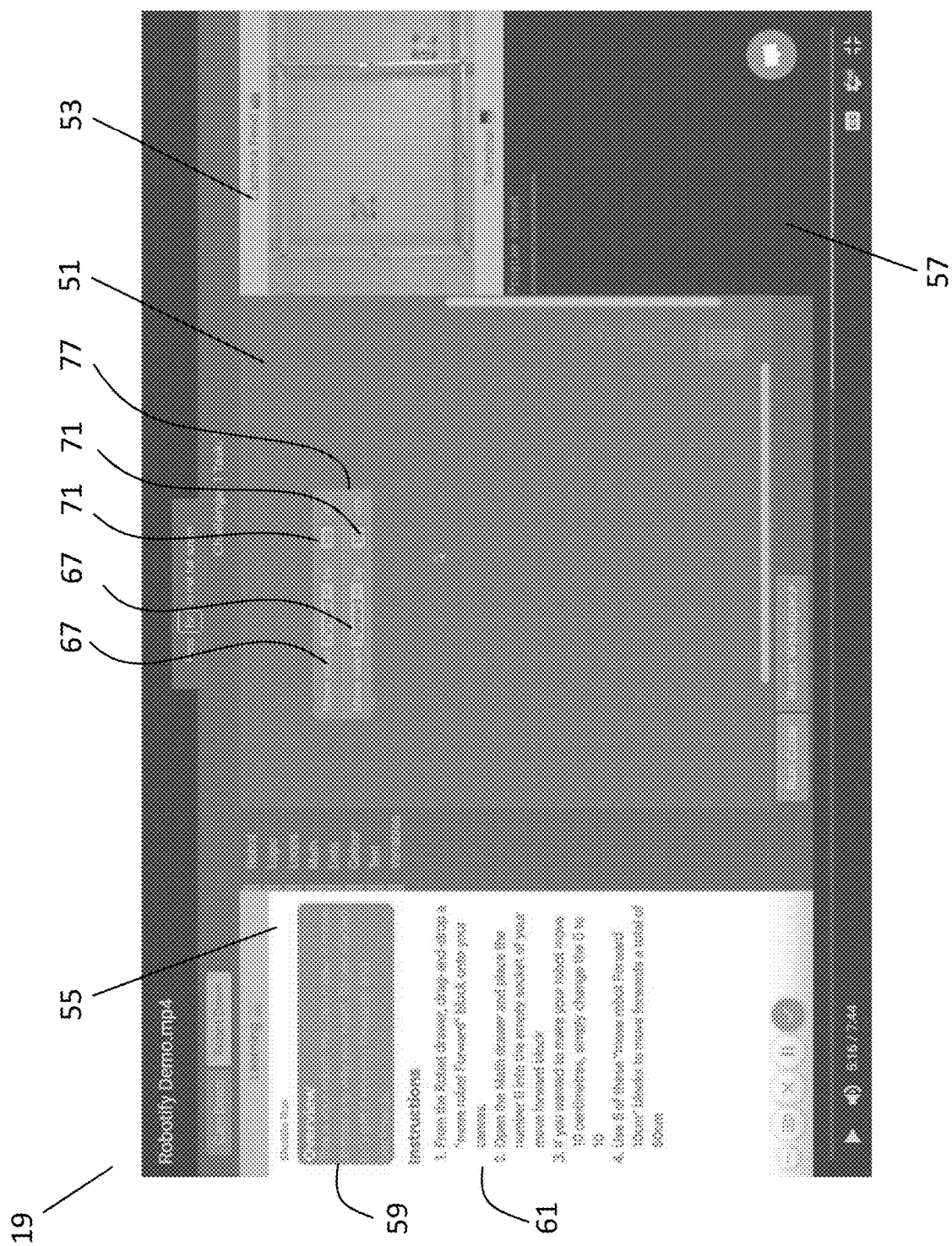
Figure 4L:
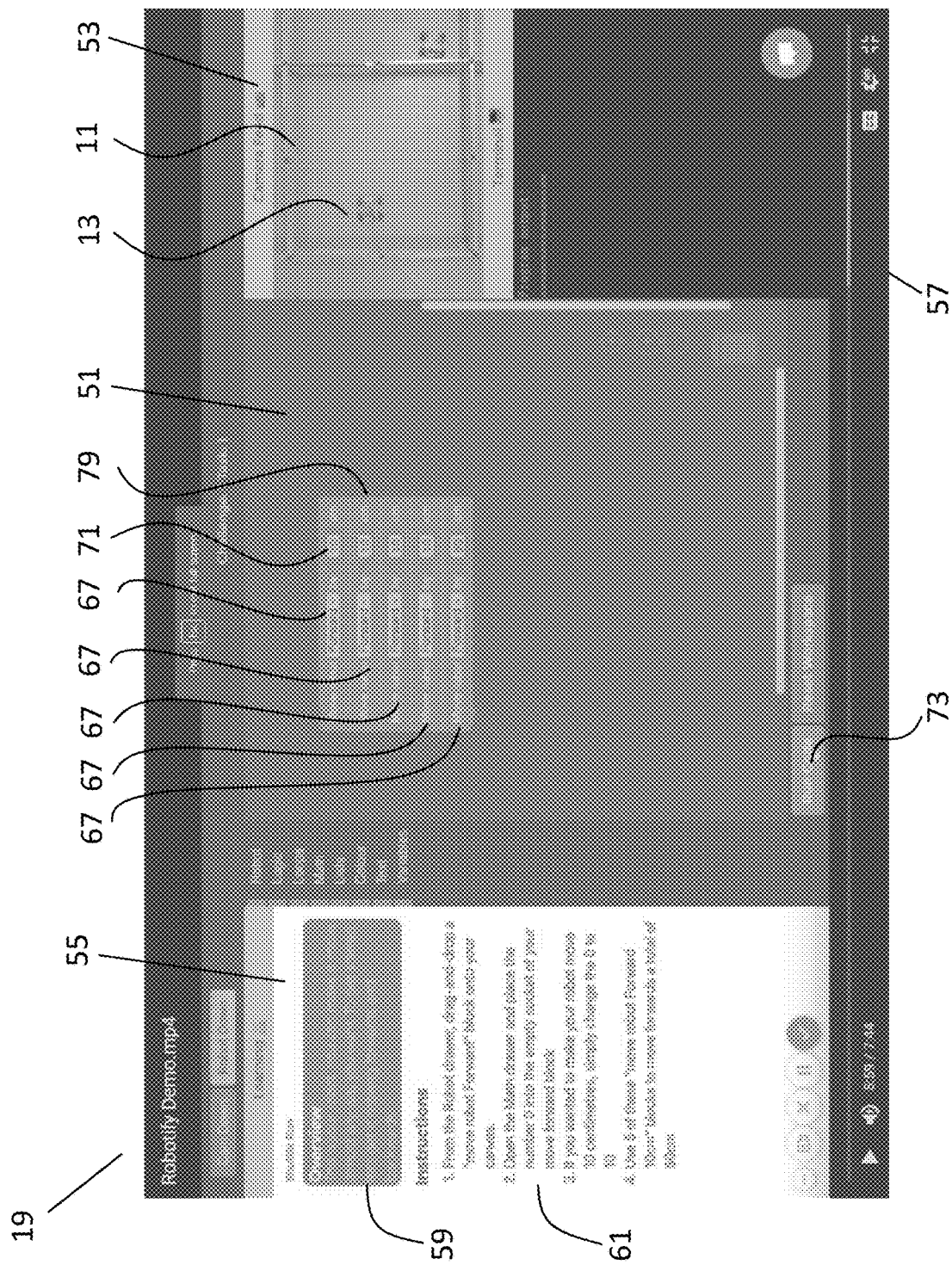
Figure 4M:
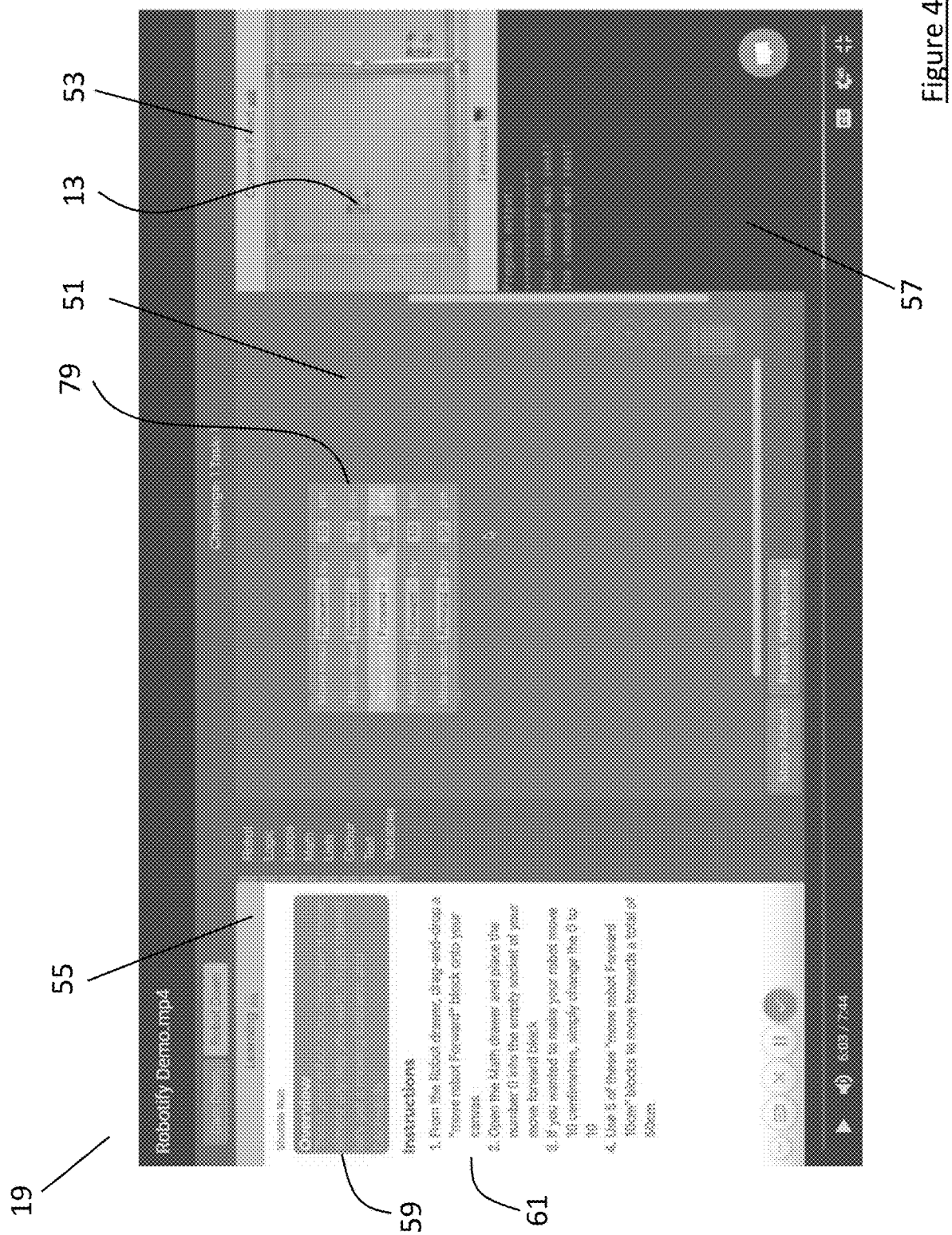
Figure 4N:
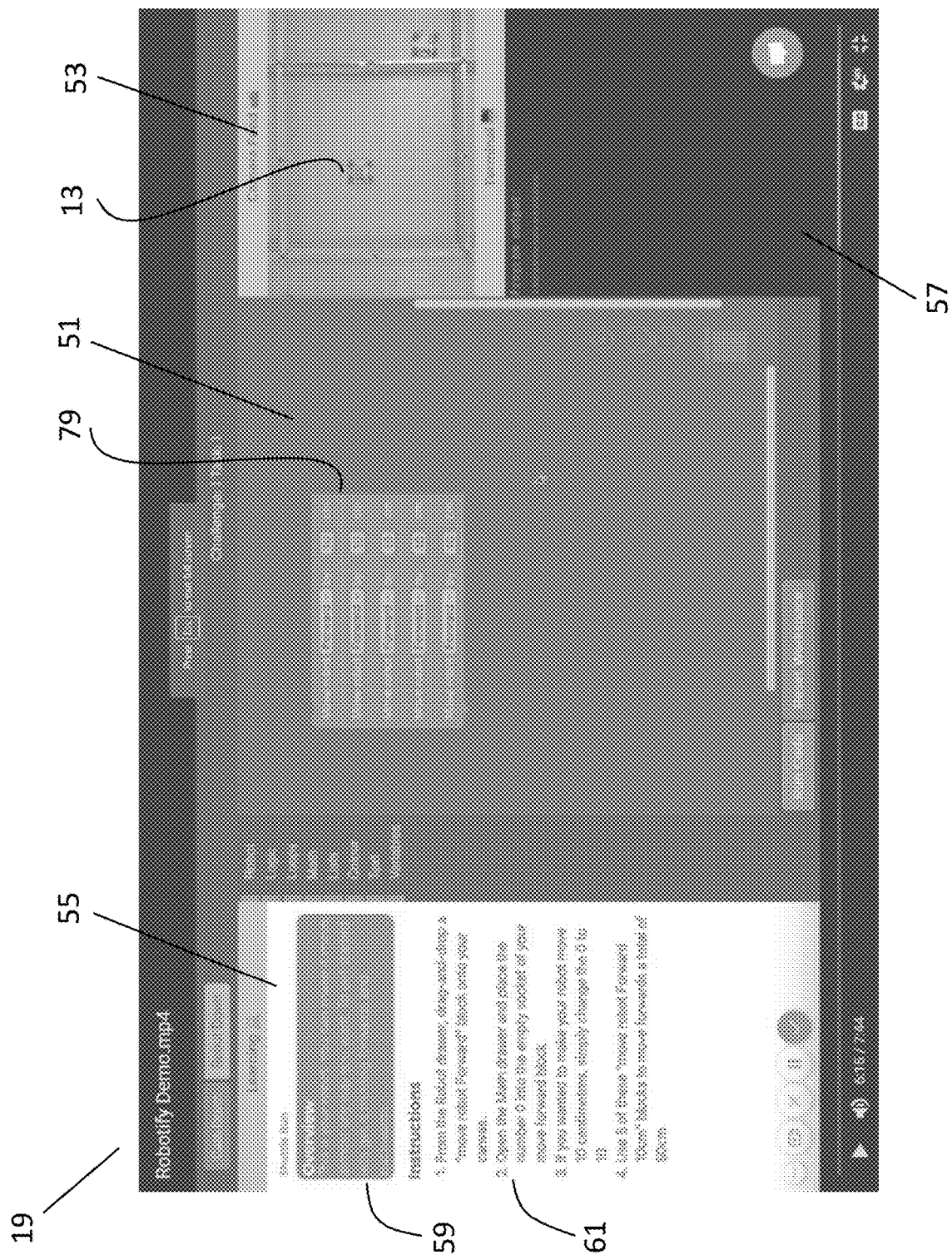
Figure 4O:
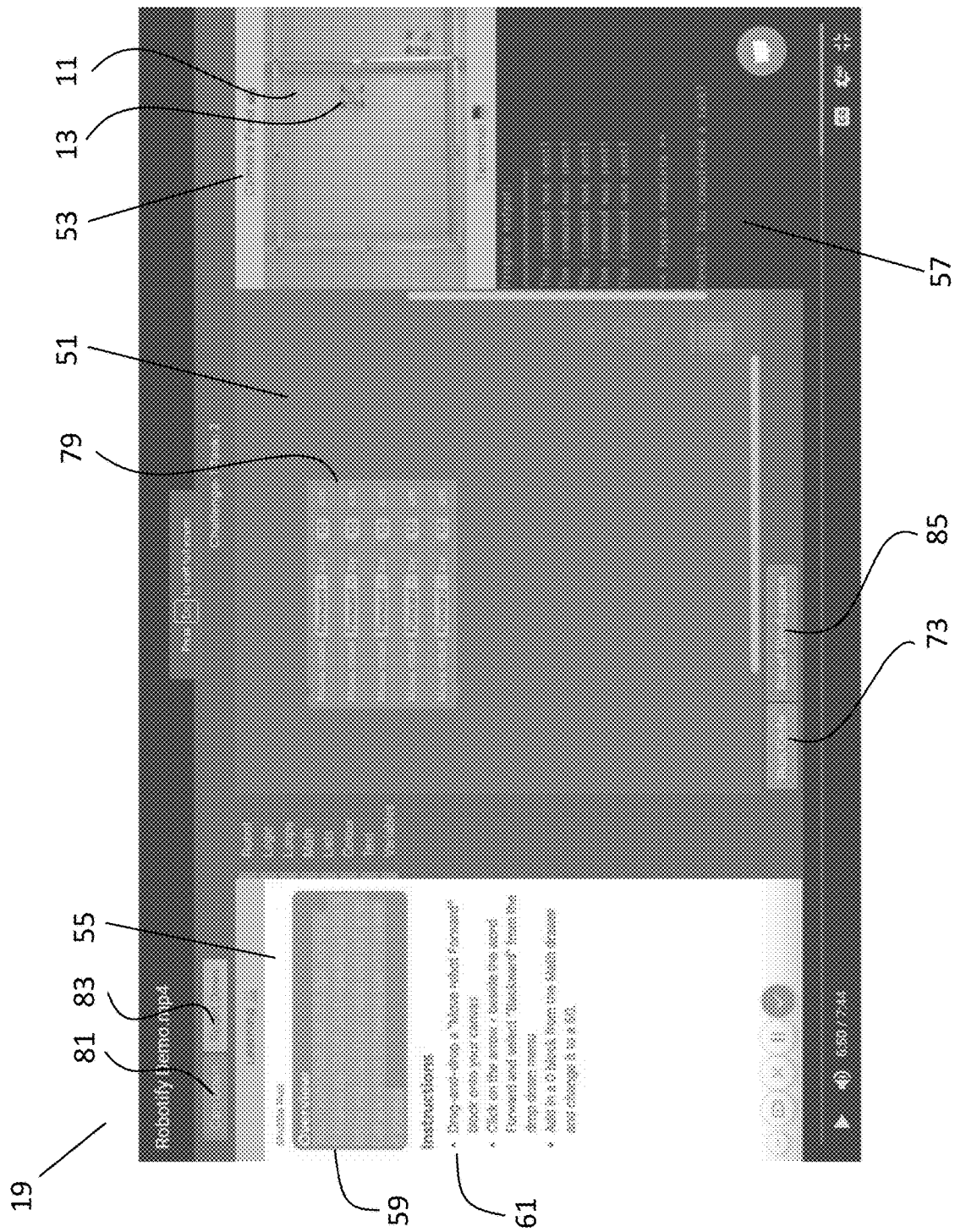

Each of the remote computing devices 7 is associated with one of the robots 13 in the robot farm 3. The remote computing devices 7 each have a communications module 15 for transmitting control commands to the robot 13 associated therewith 3 and receiving live video footage of the robot associated therewith, and a processor 17 for processing the control commands. The remote computing devices each have a user interface 19 having a plurality of panes (not shown), including a programming pane for receipt of control commands, and a video feed pane for displaying the live video feed of the robot (which will be described in more detail below with reference to FIGS. 4(a) to 4(o)). The plurality of remote computing devices 7 are illustrated as personal computers however this is not intended to be limiting and the remote computing devices may be laptop computers, tablet computers, a phablet or a so-called smart phone if desired.

The server 5 comprises a communication module 21 for communication the plurality of robots 13 in the robot farm 3, the video cameras in the robot farm and each of the plurality of remote computing devices 7. Communications between the server 5 and the plurality of remote computing device is by way of communication network 23, in this case, the internet. The server 5 has a processor 25 and a memory 27, and is operable to relay control commands from the plurality of remote computing devices 7 to the plurality of robots 13 and to relay the live video feed from the plurality of video cameras in the robot farm 3 to the plurality of remote computing devices 7.

Figure 2:
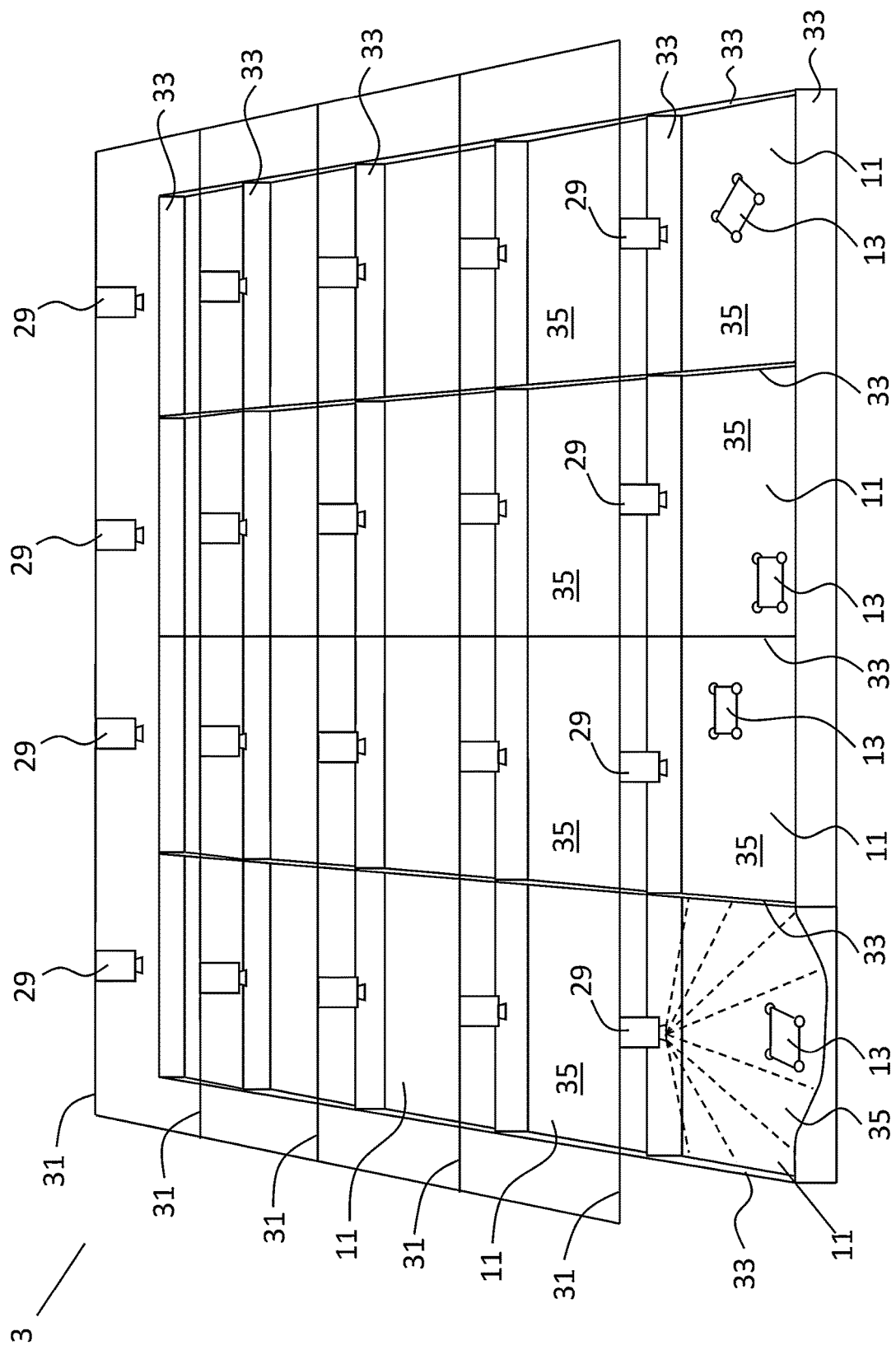
FIG. 2 is a diagrammatic representation of a robot farm forming part of the system according to the invention.

Referring now to FIG. 2, there is shown a diagrammatic representation of the robot farm 3 forming part of the system 1 according to the invention. The robot farm 3 is divided into a plurality of pods 11 that are arranged in a matrix structure having a plurality of rows and columns. Each pod 11 has a video camera 29 located directly above the pod 11 to provide a plan view of the pod 11 and the robot 13 therein.

In the embodiment shown, the video cameras 29 are suspended from cables 31 led along the row of pods however other ways to position the video cameras above the pods are envisaged. For example, the video camera could be connected to one end of a support arm (not shown) with the other end of the support arm being anchored to a wall 33 of the pod 11. The support arm would extend upwardly and inwardly from the wall 33 of the pod 11. Alternatively, the video camera could be suspended from a ceiling above the pods 11 in the facility 9 in which the robot farm is housed. As shown, the pods 11 are substantially square in shape and are provided with walls 33 on each of the four sides to provide a boundary to each pod 11. The boundary wall 33 of the pod 11 in the bottom left corner of the matrix is shown partially cut away to illustrate the location of the robot. If desired, other shapes of pods could be provided.

The floor 35 of each pod 11 may have indicia (not shown) marked thereon, such as a maze or a track or indicators of certain zones on the floor. In this way, the robot may be manipulated around the maze, track or made to move from one zone to another or to a number of zones in a predetermined order. Furthermore, it is envisaged that in order to obviate the need to change the power supply of each robot, a part of the floor 35 of each pod may comprise an inductive charging pad (not shown) that the robot 13 could return to after use in order to have its power supply recharged.

Figure 3:
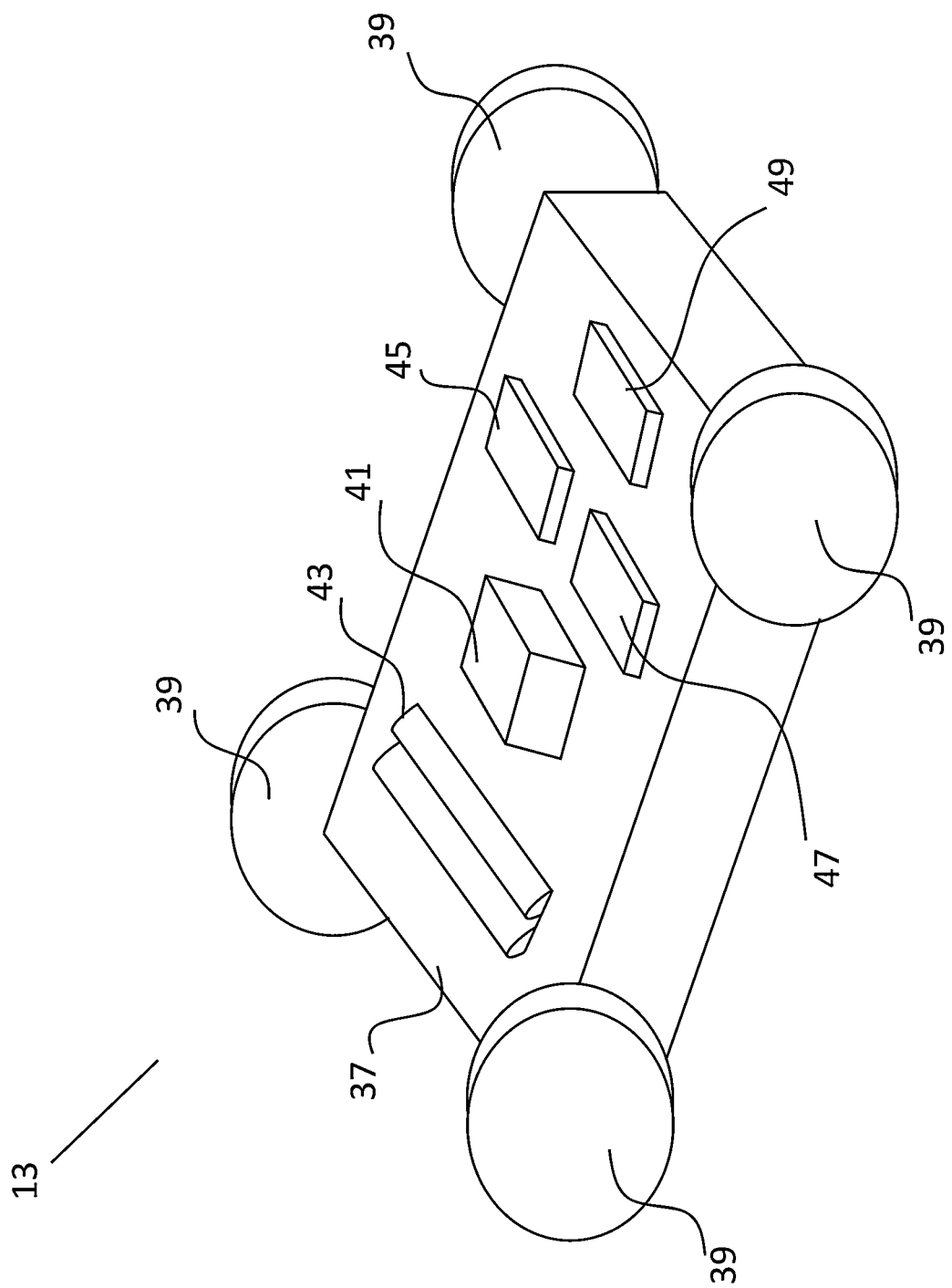
FIG. 3 is a diagrammatic representation of a robot forming part of the system according to the invention.

Referring now to FIG. 3, there is shown a diagrammatic representation of a robot 13 forming part of the system 1 according to the invention. The robot 13 comprises a wheeled chassis 37 having a plurality of wheels 39, an actuator operable to actuate the robot in response to control commands, in this case a motor 41 to drive the wheels, and a power supply, indicated by batteries 43. The robot 13 further comprises a communications module 45 for receiving control commands, a processor 47 for processing control commands, and a memory 49.

In use, a student operating a remote computing device 7 enters control commands into the remote computing device and the remote computing device sends those control commands to a robot 13 in the robot farm 3 via the server 5. The robot in the robot farm executes those commands. The video camera 29 associated with the robot 13 captures the movements on camera and the camera feed is transmitted back to the remote computing device 7 and rendered on the user interface 19 of the remote computing device 7. In this way, the student gets to see the result of their programming (i.e. the control commands) in real time. As the robots are housed in a remote robot farm, the school does not have to purchase the robot however the student still gets the benefit of seeing their programming operate on a robot and derives the benefits thereof. The robots may be used by many different students in disparate locations by scheduling time on the robots amongst the students. The maintenance and storage requirements for the school are obviated and if a robot should fail for any reason, another robot may be put in its place in the pod or another robot 13 in another pod (if available) may be allocated to the student.

Referring now to FIGS. 4(*a*) to 4(*o*) inclusive, there are shown sample user interfaces, indicated generally by the reference numeral 19, for each of the plurality of remote computing devices 7. The user interface 19 comprises a plurality of panes, including a programming pane 51 for receipt of control commands, a video feed pane 53 for displaying the live video feed of the robot, a tutorial pane 55 having user instructions for performing a task and a feedback pane 57 having an output comprising at least one of a compiled code and a commentary on the user-inputted control commands.

Referring first of all to FIG. 4(*a*), the tutorial pane 55 comprises a set of instructions to be completed by the student in order to complete a given task. These instructions may be specific to one or more students and may be prepared in advance by their teacher or the instructions may be provided as a generic pre-prepared exercise for students. Either way, the tutorial pane sets an exercise to be completed by the student. The tutorial pane includes an overview 59 of the exercise and what is trying to be achieved. In the present example, the overview 59 introduces the robot as the student's robot, informs the student that the robot may be moved around and to begin, the exercise will attempt to get the student to move the robot forwards and backwards. Below the overview 59 are instructions 61 which outline the steps that must be taken in order to complete the exercise. In the present example, this includes instructions on how the student can create the code to move the robot forward 50 centimeters (0.5 m), including retrieving blocks from different drawers of the programming pane 51 (steps 1 and 2), combining those blocks together (step 2 and 4), and editing those blocks (step 3).

Referring now to FIG. 4(*b*), step 1 of the instructions 61 recites the instruction "From the Robot drawer, drag and drop a "move robot Forward" block onto your canvas." The programming pane 51 comprises a Visual Programming Language (VPL) Editor, in this case Blockly (Registered Trade Mark®) Editor. The Blockly Editor is a VPL is an editor that represents coding concepts as interlocking blocks. it provides a way of programming in a graphical form and it outputs syntactically correct code in the programming language of the user's choice.

The programming pane 51 comprises a canvas 63 and a plurality of drawers 65 in a list structure, including Robot drawer, Logic drawer, Loops drawer, Math drawer, Lists drawer, Colour drawer, Text drawer, and Variables drawer. The student uses a pointer device, such as a mouse, stylus or their finger if the user interface of the remote computing device is a touch screen, to select the robot drawer and clicks on the drawer in the known manner to "open" the drawer and expose the options of blocks in that drawer. In the present case, only one block is available in the robot drawer, a "move robot Forward" block 67. The user selects that block 67 in the known manner and "drags" the block onto the canvas 63 portion of the programming pane 51, as illustrated in FIG. 4(*c*). This is the beginning of their programming code. Step 1 of the instructions 61 is now complete.

Referring now to FIG. 4(*d*), the student moves on to step 2 of the instructions 61. Step 2 recites the instruction: "Open the Math drawer and place the number 0 into the empty socket of your move forward block". It can be seen that there is an empty socket 69 in the block 67. The student selects the math drawer 65 from the list of drawers and again, in the example shown, only one block is displayed in the math drawer, the "number 0" block 71. The student selects the block 71 in the known manner and drags the block 71 over to the block 67 and hovers the block 71 above the socket 69 in block 67. The user then "drops" the block 71 and it will click into place in the socket 69 as illustrated in FIG. 4(*e*). It will be appreciated that the blocks 67, 71 and socket 69 are shaped so that the connections and correct positioning are intuitive. Step 2 is now complete.

Referring now to FIG. 4(*f*), the student moves on to step 3 of the instructions 61. Step 3 recites the instruction: "If you wanted to make the robot move 10 centimeters, simply change the 0 to 10". The student selects the "0" of the block 71 and types "10" into the block 71 instead of "0", thereby completing step 3. If at this stage, (before the exercise is complete) the student depressed the "Run Code" button 73, the VPL editor would run the code in the programming pane canvas 63. In this way, the code would be compiled, and the resulting instruction sent to the robot in the robot farm. The code essentially reads, "move the robot forward by 10 centimeters". Referring to FIG. 4(*g*), the code block 67 is highlighted to illustrate that the code is currently being run and the "run code" button 73 has changed to a "Stop Robot" button 75. Most importantly however, is the fact that the robot 13 in the video feed pane 53 can be seen to move forwards by 10 centimeters (0.10 m) inside its pod 11.

Once the code has been run, feedback is provided to the student in the feedback pane 57, as illustrated in FIG. 4(*h*). In the feedback pane 57, under the heading "Program output:" are the words: "The command was sent!" "<<Program Complete>>" and "Error. That is not quite right. Task incomplete." In this way, the student knows that the instruction was successfully sent to the robot, that the program has finished and that they did not successfully complete the task. The task was to move the robot forward 50 centimeters (0.5 m), not only 10 centimeters (0.1 m) and therefore is incomplete. Furthermore, the "Stop Robot" button has transitioned back to "Run Code" button 73.

Referring now to FIG. 4(*i*), the student now attempts to complete the task by carrying out step 4. Step 4 recites the instruction: "Use 5 of these "move robot Forward 10 centimeters" blocks to move forwards a total of 50 centimeters". In this way, the student is learning multiplication tables as well as programming and this is an ancillary benefit of the present invention. In addition to learning computer programming techniques, the student is also learning other subjects, in this case math. However, it is envisaged that other subjects and not simply math may be taught simultaneously to computer programming using the present invention.

In order to complete step 4, the student again selects the robot drawer 65 and selects the "move robot Forward" block 67 from the drawer, as illustrated in FIG. 4(*i*). The student then drags the "move robot Forward" block 67 over to the canvas 63 and drops the "move robot Forward" block 67 just beneath the "move robot Forward" block 67 populated with the math block 71 already on the canvas, as illustrated in FIG. 4(*j*). The two "move robot Forward" blocks 67 are then combined together to form a longer string of program code. It will be seen that the "move robot Forward" blocks 67 each have a dimple and a boss (in much the same way that two adjacent jigsaw pieces each have one part of a male and a female complementary connector) to illustrate how the two blocks can be combined together.

The student then accesses the math drawer 65 again, selects the "number 0" block 71 from the available list, drags the "number 0" block 71 over to the most recently placed "move robot Forward" block 67 and places the "number 0" block 71 into the socket 69 of the "move robot Forward" block 67. Thereafter, the student again types "10" into the editable portion of the "number 0" block 71. The resultant code segment 77 is as illustrated in FIG. 4(*k*). This is repeated a further three times to combine five "move robot Forward" blocks 67 together however with the last block, the student inadvertently inserts "50" instead of "10" into the "number 0" block 71, resulting in the code segment 79 as illustrated in FIG. 4(*l*). If the student then depresses the run code button 73, the Blockly® Editor will run the code and send the instructions to the robot 13 in the robot farm 3, which may be viewed in the video feed pane 53.

As the Blockly® Editor goes through each instruction in the code segment 79, the instruction in the code segment 79 being processed is highlighted, as illustrated in FIG. 4(*m*) and after the instruction has been processed, the feedback pane 57 is updated by placing under the heading "Program output:" the words: "The command was sent!" for each completed instruction. In FIG. 4(*m*), as the third instruction in the code segment 79 is being processed, the feedback pane 57 indicates that the first two instructions have been processed and the control command has been sent to the robot 13. Once the code has been compiled, the robot 13 would move 90 centimeters (0.9 m) forwards across the pod 11. An error message, as indicated previously, would be displayed to the operator as the robot had moved 90 centimeters (0.9 m) instead of 50 centimeters (0.5 m). If however, the student corrects their mistake and inserts "10" Instead of "50" into the final "number 0" block 71 of the bottom-most "move robot Forward" blocks 67 in the code segment 79 before clicking on the "Run Code" button 73, as illustrated in FIG. 4(*n*), the task will be completed successfully and the robot 13 will move forwards 50 centimeters (0.5 m) across the pod 11.

Referring now to FIG. 4(*o*), once the task has been completed successfully, the robot 13 will have moved 50 centimeters (0.5 m) across the pod, as shown in the video feed pane 53, and the feedback pane 57 will have the words "The command was sent!" five times under the words "Program Output", followed by "<<Program Complete>>" and then "Result: You completed the task!". In addition, the words in the tutorial pane 55 will have changed to the next task. In this instance, the overview 59 will now read "You might have noticed that moving forwards by 10 cm and repeating that 5 times was could be made even simpler. Get your robot to reverse back to where it started." The instructions 61 will now read "Drag-and-drop a "Move robot Forward" block onto your canvas. Click on the arrow ▼ beside the word "Forward" and select "Backward" from the drop down menu. Add in a 0 block from the Math drawer and change it to a 50." In other words, the next task will be to generate the code to reverse the robot 50 centimeters (0.5 m). however, in this instance, it is shown that the step may be done in one step, with only two blocks 67, 71, as opposed to using 10 blocks. This is a good way of introducing the concept of variables and different ways of programming, resulting in the same solution, to the student.

In the screen shots 4(*a*) to 4(*o*) inclusive, there is further shown a number of buttons on the user interface including a "Cam Down" button 81, a "Robot Down" button 83 and a "Reset Workspace" button 85. If the video feed camera is not operating or if the robot is not responding, the user may click on the respective "Cam Down" button 81 or a "Robot Down" button 83 to alert the system administrator that there is a problem in the robot farm 3. If the user wishes to clear their canvas 63, they may do so by clicking on the "Reset Workspace" button 85.

It will be understood that various modifications may be made to the system and method described above without departing from the scope of the claims. For example, in the embodiments shown and described, the computing devices are described as remote. Indeed, this is to indicate that they are typically located remotely from the robot farm. However, it could be considered that the computing devices are local and the server and robot farm are remote from the computing devices.

In the embodiments shown, the robots are relatively simple devices with a chassis and wheels driven by a motor. Other robots are envisaged with other functionality including a claw, magnet or scoop for picking up objects, robots with tracks, robots that resemble a crane that are fixed in position in the pod 11 but may rotate a boom about a mast and have a hook or other device that may move along the boom in a reciprocal fashion. The wheeled chassis robot may have more or less than 4 wheels or may have caterpillar tracks. The robot may be provided with one or more sensors including a proximity sensor, a temperature sensor, an infrared (IR) sensor, an ambient light sensor, a pressure sensor, a switch including, but not limited to a spring loaded switch, one or more lights including, for example, one or more LEDs. Although the wheeled chassis is preferred as it is particularly simple to use and manufacture, what is important is in fact the fact that the robot may move in the pod 11 and be seen to move in response to user inputted commands in a programming language.

The pods 11 are walled pods and are relatively simple in configuration however other, more complex configurations are readily envisaged. For example, the pods may comprise a maze or other obstacle course for the robot to navigate. The pods may also be provided with lights or other components capable of being sensed by one or more sensors on the robot, if provided. The lights may also indicate whether or not the robot's power supply is charged, whether or not the robot is functional, whether or not the robot is ready to receive instructions, and/or whether or not the robot is currently executing instructions or the like.

In the embodiments of the user interface 19 shown, four panes 51, 53, 55 and 57 are provided in the user interface however less than four panes may be shown simultaneously. Indeed, it is envisaged that two panes may be shown simultaneously, for example the programming pane 51 and the video feed pane 53 may be shown simultaneously. The relative sizes of the panes may differ from those shown and the video pane may be larger than shown and other panes may be larger or smaller than shown. It is envisaged that one or more panes may be minimized at will or when not in operation. For example, the feedback pane 57 may be in a pop-up window that only appears when the code is being processed and to provide feedback on the success or failure of the task.

In the embodiments shown, a VPL Editor, specifically Blockly® Editor is used in the programming pane 51. The VPL Editor is particularly suitable for young children starting out programming. Other VPL Editors, such as, but not limited to, Scratch® may also be used instead of Blockly®. It is envisaged that other editors, that are not VPL based may be used as the student progresses in knowledge and experience. For instance, the programming pane may support textual programming languages as well as or instead of the VPL.

In the embodiments described, only a small subset of the available blocks are illustrated. It will be understood that each of the drawers 65 may contain more than one block and indeed probably will contain more than one block. It is envisaged that the available blocks may be limited by a teacher or other course creator to prevent confusion. In other cases, such as for a final test or for advanced users, the entire library of blocks may be made available. The blocks may be custom built blocks if desired that may be provided to teach a certain concept or programming technique.

In the embodiments described the server may be a Python® server or other server capable of handling communications to and from the remote computing devices, the video cameras and the robots. In the embodiments described, the server is described as having a communication module to handle all of these communications however this communication module may comprise a number of components, each of which may handle a different communication channel. For example, a component for communication with the remote computing devices to receive instructions from those devices, another component to communicate with the robots and another component to receive the video feed and return the video feed back to the remote computing devices.

Preferably, the control command communications to and from the server (i.e. the control commands received from the server from the remote computing devices and the control commands sent from the server to the robots) are transmitted using a Message Queuing Telemetry Transport (MQTT) protocol. HTTP could be used however MQTT is seen as more reliable, robust and avoids latency in the system. In addition, to reduce latency further, the instruction set used with the robots is ideally a reduced bit set instruction protocol. Preferably, the reduced bit set instruction protocol has instructions of less than or equal to six bytes in length. In this way, the processing overhead and memory overhead on the robots will be reduced, thereby reducing latency and in addition the volume of data to be processed at the server will be reduced further.

In the embodiments shown, the server will have a wireless communication channel with each of the robots. The server may have a wired or wireless communication channel with each of the video cameras. The server may be located in the same building as the robot farm or may be located remotely if desired (in which case, the connection with the video cameras will not be wired).

It can be seen that all communications are routed through the server. However, it is envisaged that the remote computing devices may communicate directly with the robots to send control commands to the robots. The processing and compiling of the program code may be performed locally on the remote computing device or remotely on the server. It is envisaged that it would be preferable to have the processing and compiling of code done on the remote computing device. This will spread the load of the processing requirement and will reduce the data that must be transmitted to the server. It is envisaged that the user interface will comprises a browser window that may have embedded therein a compiler to compile the code.

It will be understood that the present invention may be used by a number of disparate users in disparate locations. For example, the robots may be pre-booked for hour long (or other duration) slots in advance and the remote computing devices will belong to those individuals that booked the robots for that time. This may change from booking slot to booking slot. For example, the robot farm may be used by children in a classroom in Australia for a first part of the day, children in a classroom in China for a second part of the day, children in a classroom in Ireland, Europe for a third part of the day, children in a classroom in New York for a fourth part of the day and children in a classroom in San Francisco, Calif. for a fifth part of the day. In this way, the robot farm can be in operation 24 hours a day, seven days a week. It is envisaged that the users will not simply be in a classroom environment, home schoolers and recreational users or individuals wishing to learn programming for other purposes may use the system from time to time. This could be at any time of day, in any place around the world. The server will also provide a booking engine to allow the robot farm to be pre-booked and to allocate robots to a user at a given time.

It will be understood that a certain robot need not necessarily be associated with a single remote computing device and by corollary, a certain remote computing device need not necessarily be associated with the same robot each time the user logs on to the system.

It is envisaged that when the user of a remote computing device logs into the system using a log in name and log in password, the server will validate the log in details and thereafter if the details are correct, will allocate one of the robots in the robot farm to that remote computing device. This will further allow the operator of the robot farm to control the usage of each of the robots and to spread the workload over the robots in the robot farm.

In the embodiments shown, only one robot is shown in each pod. It is envisaged however that more than one robot may be provided in a single pod. For example, the user device may have the ability to operate multiple robots in the one pod in order to make the robots work together to complete a task. Equally well, two or more robots may be provided in the pods and different users operating different remote computing devices may each operate one of the robots in the pod. In this case, competitions or "robot wars" may be set to pit the wits of one programmer up against those of another programmer.

It will be understood that various parts of the present invention are performed in hardware and other parts of the invention may be performed either in hardware and/or software. It will be understood that the method steps and various components of the present invention will be performed largely in software and therefore the present invention extends also to computer programs, on or in a carrier, comprising program instructions for causing a computer or a processor to carry out steps of the method or provide functional components for carrying out those steps. The computer program may be in source code format, object code format or a format intermediate source code and object code. The computer program may be stored on or in a carrier, in other words a computer program product, including any computer readable medium, including but not limited to a floppy disc, a CD, a DVD, a memory stick, a tape, a RAM, a ROM, a PROM, an EPROM or a hardware circuit. In certain circumstances, a transmissible carrier such as a carrier signal when transmitted either wirelessly and/or through wire and/or cable could carry the computer program in which cases the wire and/or cable constitute the carrier.

It will be further understood that the present invention may be performed on two, three or more devices with certain parts of the invention being performed by one device and other parts of the invention being performed by another device. The devices may be connected together over a communications network. The present invention and claims are intended to also cover those instances where the system is operated across two or more devices or pieces of apparatus located in one or more locations.

In this specification the terms "comprise, comprises, comprised and comprising" and the terms "include, includes, included and including" are all deemed totally interchangeable and should be afforded the widest possible interpretation.

The invention is not limited to the embodiments hereinbefore described but may be varied in both construction and detail within the scope of the appended claims.

The invention claimed is:

1. A system for teaching computer programming comprising:
   a robot farm, a plurality of remote computing devices, and a server;
   the robot farm comprising a plurality of pods, each pod housing a robot therein and each pod having a video camera associated therewith operable to capture and transmit a live video feed of the robot in the pod, each robot having a communications module for receiving control commands, a processor for processing control commands, a power supply, and at least one actuator operable to actuate the robot in response to control commands, and in which each of the robots in the robot farm is monitored, repaired and maintained by a robot farm technician;
   the plurality of remote computing devices each being associated with a robot in the robot farm, the remote computing devices each having a communications module for transmitting control commands to the robot associated therewith and receiving live video footage of the robot associated therewith; and a processor for processing the control commands;
   each of the plurality of remote computing devices having a user interface having a plurality of panes, including a programming pane for receipt of control commands, and a video feed pane for displaying the live video feed of the robot, the programming pane and the video feed pane being shown simultaneously;
   the server having a communication module for communication with each of the plurality of robots in the robot farm, each of the video cameras in the robot farm and each of the plurality of remote computing devices; the server having a processor and a memory, and the server being operable to relay control commands from the plurality of remote computing devices to the plurality of robots and to relay the live video feed from the plurality of video cameras in the robot farm to the plurality of remote computing devices.

2. The system for teaching computer programming as claimed in claim 1 in which the user interface comprises a tutorial pane, the tutorial pane having user instructions for performing a task.

3. The system for teaching computer programming as claimed in claim 1 in which the user interface comprises a feedback pane, the feedback pane having an output comprising at least one of a compiled code and a commentary on the user-inputted control commands.

4. The system for teaching computer programming as claimed in claim 1 in which the programming pane comprises a Visual Programming Language (VPL) Editor.

5. The system for teaching computer programming as claimed in claim 4 in which the programming pane comprises a Blockly Editor.

6. The system for teaching computer programming as claimed in claim 1 in which the user interface comprises a web page opened in a web browser.

7. The system for teaching computer programming as claimed in claim 1 in which remote computing device comprises a code compiler embedded in the user interface.

8. The system for teaching computer programming as claimed in claim 1 in which the control commands are transmitted using a Message Queuing Telemetry Transport (MQTT) protocol.

9. The system for teaching computer programming as claimed in claim 1 in which the control commands are converted using a reduced bit set instruction protocol.

10. The system for teaching computer programming as claimed in claim 9 in which the reduced bit set instruction protocol has instructions of less than or equal to six bytes in length.

11. The system for teaching computer programming as claimed in claim 1 in which the video camera of the pod is positioned vertically over the pod to provide a plan view of the pod.

12. The system for teaching computer programming as claimed in claim 1 in which the plurality of pods of the robot farm are arranged side by side in a matrix structure having a plurality of rows and a plurality of columns.

13. The system for teaching computer programming as claimed in claim 1 in which the pods are each bounded by a boundary wall surrounding the perimeter of the pod.

14. The system for teaching computer programming as claimed in claim 1 in which each of the robots comprises a vehicle having a motor and at least two wheels driven by the motor.

15. The system for teaching computer programming as claimed in claim 14 in which the vehicle is provided with a plurality of sensors.

16. A computer implemented method of teaching computer programming comprising the steps of:
   providing, on a user computing device, a user interface having a plurality of panes including a programming pane and a video feed pane, the programming pane and the video feed pane being shown simultaneously;
   receiving, in the programming pane of the user interface of the user computing device a control command;
   transmitting the control command from the user computing device to a robot in a robot farm via an intermediary server, the robot in the robot farm being monitored, repaired and maintained by a robot farm technician;
   capturing, using a video camera, a live video feed of the robot in the robot farm executing the control command;
   transmitting the video feed of the robot in the robot farm executing the control command to the user computing device via the intermediary server; and rendering, in the video feed pane of the user interface of the user computing device, the video feed of the robot in the robot farm executing the control command.

17. The computer implemented method of teaching computer programming as claimed in claim 16 in which the step of: receiving, in the programming pane of the user interface of the user computing device a control command further comprises receiving a control command in a VPL.

18. The computer implemented method of teaching computer programming as claimed in claim 16 in which the method comprises the step of converting the control command using a reduced bit set instruction protocol.

19. The computer implemented method of teaching computer programming as claimed in claim 16 in which the control commands are transmitted using a MQTT protocol.

20. The computer implemented method of teaching computer programming as claimed in claim 16 in which the user interface comprises a tutorial pane and the method comprising the additional step of providing user instructions in the tutorial pane of the user interface.

21. The computer implemented method of teaching computer programming as claimed in claim 16 in which the user interface comprises a feedback pane and the method comprising the additional step of providing at least one of compiled code and commentary on the user inputted control commands in the feedback pane of the user interface.

* * * * *